United States Patent [19]

Johansson et al.

[11] Patent Number: 5,488,634

[45] Date of Patent: Jan. 30, 1996

[54] LOWER TIE PLATE DEBRIS CATCHER FOR A NUCLEAR REACTOR

[75] Inventors: Eric B. Johansson, Wrightsville Beach, N.C.; Robert B. Elkins; Bruce Matzner, both of San Jose, Calif.; Gerald M. Latter, Wilmington, N.C.; Richard A. Proebstle, San Jose, Calif.

[73] Assignee: General Electric Company, Schenectady, N.Y.

[21] Appl. No.: 194,357

[22] Filed: Feb. 10, 1994

[51] Int. Cl.⁶ .................................................. G21C 19/42
[52] U.S. Cl. .................... 376/313; 376/310; 376/352; 376/439; 376/446
[58] Field of Search .................................. 376/313, 310, 376/352, 439, 446; 976/DIG. 263

[56] References Cited

U.S. PATENT DOCUMENTS

| | | | |
|---|---|---|---|
| 1,240,081 | 9/1917 | Moss | 210/521 |
| 1,504,233 | 8/1924 | Graham | 210/441 |
| 1,992,472 | 2/1935 | Craig | 210/165 |
| 3,414,474 | 12/1968 | Swanson | 376/425 |
| 3,528,885 | 9/1970 | Kumpf | 376/440 |
| 3,725,199 | 4/1973 | Notari et al. | 376/352 |
| 3,801,453 | 4/1974 | Jones | 376/440 |
| 3,840,051 | 10/1974 | Akashi et al. | 138/37 |
| 3,878,870 | 4/1975 | Atherton et al. | 376/352 |
| 3,879,259 | 4/1975 | Persson et al. | 376/224 |
| 3,944,467 | 3/1976 | Biermann et al. | 376/442 |
| 3,945,883 | 3/1976 | Hind et al. | 376/280 |
| 3,971,698 | 7/1976 | Wolff et al. | 376/352 |
| 4,032,398 | 6/1977 | Cross et al. | 376/443 |
| 4,036,690 | 7/1977 | Betts et al. | 376/175 |
| 4,053,358 | 10/1977 | Pennell | 376/280 |
| 4,053,359 | 10/1977 | Pennell et al. | 376/365 |
| 4,076,586 | 2/1978 | Bideau et al. | 376/364 |
| 4,096,032 | 6/1978 | Mayers | 376/313 |
| 4,116,764 | 9/1978 | Jones | 376/280 |
| 4,198,272 | 4/1980 | Salmon | 376/175 |

(List continued on next page.)

FOREIGN PATENT DOCUMENTS

| | | |
|---|---|---|
| 90104066 | 6/1990 | China . |
| 0196611 | 10/1986 | European Pat. Off. . |
| 0289829 | 11/1988 | European Pat. Off. . |
| 0311037 | 4/1989 | European Pat. Off. . |
| 0432738A1 | 6/1991 | European Pat. Off. . |
| 0432739A1 | 6/1991 | European Pat. Off. . |
| 0435744A1 | 7/1991 | European Pat. Off. . |
| 0455011A1 | 11/1991 | European Pat. Off. . |
| 0466553A1 | 1/1992 | European Pat. Off. . |
| 4006264A1 | 8/1991 | Germany . |
| 54-19080 | 2/1979 | Japan . |
| 54-102493 | 8/1979 | Japan . |
| 54-141989 | 11/1979 | Japan . |
| 57-102215 | 6/1982 | Japan . |
| 60-162985 | 8/1985 | Japan . |
| 62-96891 | 5/1987 | Japan . |
| 63-61183 | 3/1988 | Japan . |
| 63-157093 | 6/1988 | Japan . |
| 64-39593 | 2/1989 | Japan . |
| 64-83189 | 3/1989 | Japan . |
| 3-111795 | 5/1991 | Japan . |
| 3-274491 | 12/1991 | Japan . |
| 1214998 | 12/1970 | United Kingdom . |

*Primary Examiner*—Donald P. Walsh
*Assistant Examiner*—Meena Chelliah
*Attorney, Agent, or Firm*—Nixon & Vanderhye

[57] ABSTRACT

A unitary one-piece lower tie plate grid has a lower portion and an upper portion for supporting the fuel rods. The lower tie plate grid includes cylindrical boss portions extending upwardly from the lower grid portion and arranged in square matrices for receiving the lower end plugs of the fuel rods. Web portions extending upwardly from the lower tie plate portion interconnect the boss portions along the sides of the matrices. The lower grid portion includes a plurality of openings which open into the flow spaces defined by the convex portions of the bosses and the webs within each square matrix of the upper portion of the tie plate. Coolant flows through the openings into the flow spaces for further flow upwardly about the fuel rods. The openings are radiussed adjacent their lower ends and have divergent side walls downstream of a throat area to define a flow venturi.

16 Claims, 7 Drawing Sheets

U.S. PATENT DOCUMENTS

| | | | |
|---|---|---|---|
| 4,412,969 | 11/1983 | Tilbrook et al. | 376/280 |
| 4,420,457 | 12/1983 | Le Pargneux | 376/446 |
| 4,427,624 | 1/1984 | Marlatt et al. | 376/352 |
| 4,446,099 | 5/1984 | Schwind et al. | 376/277 |
| 4,505,877 | 3/1985 | Rion | 376/352 |
| 4,601,838 | 9/1986 | Gasparro et al. | 376/248 |
| 4,614,636 | 9/1986 | Walters | 376/451 |
| 4,615,862 | 10/1986 | Huckstein | 376/352 |
| 4,634,525 | 1/1987 | Yant | 210/171 |
| 4,652,425 | 3/1987 | Ferrari et al. | 376/352 |
| 4,655,995 | 4/1987 | Freeman et al. | 376/267 |
| 4,664,880 | 5/1987 | Bryan | 376/352 |
| 4,678,627 | 7/1987 | Rylatt | 376/31.3 |
| 4,684,495 | 8/1987 | Wilson et al. | 376/352 |
| 4,684,496 | 8/1987 | Wilson et al. | 376/352 |
| 4,716,012 | 12/1987 | Gasparro et al. | 376/352 |
| 4,772,447 | 9/1988 | Manson et al. | 376/441 |
| 4,781,884 | 11/1988 | Anthony | 376/439 |
| 4,826,653 | 5/1989 | Nylund et al. | 376/444 |
| 4,828,791 | 5/1989 | DeMario | 376/352 |
| 4,832,905 | 5/1989 | Bryan et al. | 376/352 |
| 4,849,161 | 7/1989 | Brown et al. | 376/439 |
| 4,900,507 | 2/1990 | Shallenberger et al. | 376/352 |
| 4,919,883 | 4/1990 | Bryan et al. | 376/352 |
| 4,980,121 | 12/1990 | Roberts et al. | 376/439 |
| 4,997,621 | 3/1991 | Johansson et al. | 376/444 |
| 5,009,839 | 4/1991 | King | 376/352 |
| 5,024,806 | 6/1991 | Cioffi et al. | 376/352 |
| 5,024,807 | 6/1991 | Hatfield et al. | 376/352 |
| 5,030,412 | 7/1991 | Yates et al. | 376/352 |
| 5,037,605 | 8/1991 | Riordan, III | 376/352 |
| 5,066,453 | 11/1991 | Heppenstall et al. | 376/352 |
| 5,071,617 | 12/1991 | Bryan et al. | 376/352 |
| 5,094,802 | 3/1992 | Riordan, III | 376/352 |
| 5,100,611 | 3/1992 | Nylund | 376/352 |
| 5,106,575 | 4/1992 | Nakamura et al. | 376/439 |
| 5,128,096 | 7/1992 | Grattier | 376/313 |
| 5,135,710 | 8/1992 | Grattier et al. | 376/313 |
| 5,160,697 | 11/1992 | Verdier et al. | 376/352 |
| 5,180,545 | 1/1993 | Grattier | 376/352 |
| 5,219,517 | 6/1993 | Nylund | 376/352 |
| 5,230,861 | 7/1993 | Nylund | 376/439 |
| 5,282,231 | 1/1994 | Adams et al. | 376/352 |
| 5,345,483 | 9/1994 | Johansson | 376/313 |

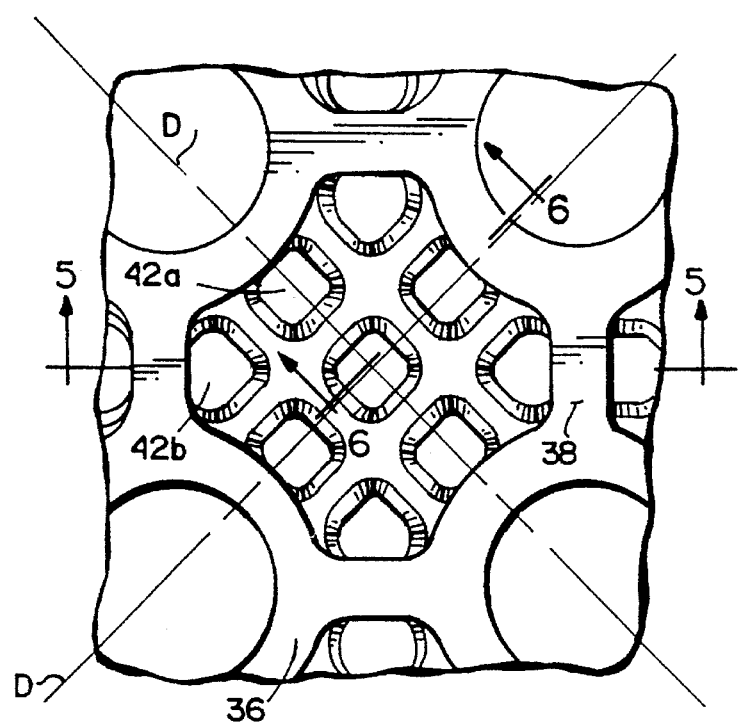
Fig. 4
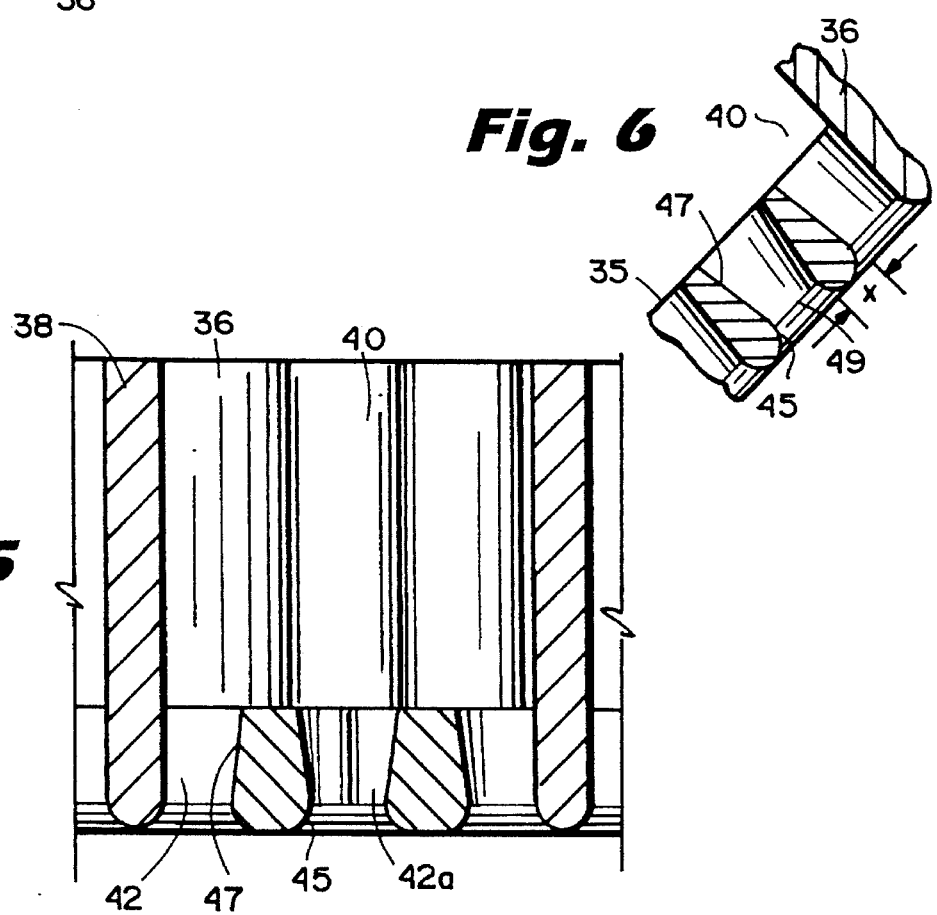
Fig. 6
Fig. 5

5,488,634

LOWER TIE PLATE DEBRIS CATCHER FOR A NUCLEAR REACTOR

TECHNICAL FIELD

The present invention relates to a lower tie plate grid for a nuclear reactor fuel bundle and particularly relates to a unitary one-piece lower tie plate grid forming part of a lower tie plate assembly, the grid having a lower portion with a plurality of small openings for separating debris from the flow of water coolant through the tie plate, and an upper portion which, in conjunction with the lower portion, support the fuel bundle. The grid is constructed to afford a minimum pressure loss for the water coolant flow through the tie plate grid into the region downstream of the tie plate assembly.

BACKGROUND

Boiling water nuclear reactors have been in operation for many years. Commencing with their initial construction and throughout their service lives, these reactors may accumulate debris in their closed circulation moderator systems. This debris can become an operating hazard if the debris is allowed to enter into the fuel bundle core region containing the heat generating fuel rods. In order to understand this problem, a summary of reactor construction as it relates to the accumulation of debris in the core needs first to be given. Thereafter, fuel bundle construction will be set forth. Emphasis will be given to the need to preserve substantially unchanged the regions of pressure drop within the fuel bundles. Thereafter, the effects caused by debris entering into the fuel rod region of the fuel bundles will be summarized.

In boiling water nuclear reactor construction, the reactor is provided with a large, central core. Liquid water coolant/moderator flow enters the core from the bottom and exits the core as a water steam mixture from the top. The core includes many side-by-side fuel bundles, each containing a plurality of fuel rods. Water is introduced into each fuel bundle through a fuel bundle support casting from a high pressure plenum situated below the core. Water passes in a distributed flow through the individual fuel bundles and about the fuel rods, is heated to generate steam, and exits the upper portion of the core as a two-phase water steam mixture from which the steam is extracted for the generation of energy.

The core support castings and fuel bundles are a source of pressure loss in the circulation of water through the core. By properly controlling such pressure losses substantially even distribution of flow across the individual fuel bundles of the reactor core is achieved. When it is remembered that there are as many as 750 individual fuel bundles in a reactor core, it can be appreciated that assurance of the uniformity of flow distribution is important. To interfere with the pressure drop within the fuel bundles could affect the overall distribution of coolant/moderator within the fuel bundles of the reactor core.

The fuel bundles for a boiling water nuclear reactor include a fuel rod supporting lower tie plate assembly. Typically, this is a one-piece cast structure including an upper grid, a lower inlet nozzle and a structure providing a transition region from the inlet to the grid. The inlet nozzle provides for coolant entry to an enlarged flow volume within the flow transition region of the lower tie plate assembly. At the upper end of the flow volume, there is located a tie plate grid defining with the nozzle a flow volume. The tie plate grid has two purposes. First, it provides the mechanical support connection for the weight of the individual fuel rods to be transmitted through the entire lower tie plate assembly to the fuel support casting. Secondly, the tie plate grid provides a path for liquid water moderator to flow into the fuel bundle for passage between the side-by-side supported fuel rods.

Above the lower tie plate grid, each fuel bundle includes a matrix of upstanding fuel rods—sealed tubes each containing fissionable material which when undergoing nuclear reaction transfers energy to the flowing water to produce the power generating steam. The matrix of upstanding fuel rods includes at its upper end an upper tie plate assembly. This upper tie plate assembly holds at least some of the fuel rods in vertical side-by-side alignment. Some of the fuel rods are attached to both the upper and lower tie plate assemblies. Usually, water rods are also included between the upper and lower tie plate assemblies for improvement of the water moderator to fuel ratio, particularly in the upper region of the fuel bundle.

Fuel bundles also include a number of fuel rod spacers at varying elevations along the length of the fuel bundle. These spacers are required because the fuel rods are long (about 160 inches) and slender (about 0.4 to 0.5 inches in diameter), and would come into abrading contact under the dynamics of fluid flow and nuclear power generation within the fuel bundles. The spacers provide appropriate lateral restraints for each fuel rod at their respective elevations and thus prevent abrading contact between the fuel rods and maintain the fuel rods at uniform spacing relative to one another along the length of the fuel bundle for optimum performance. It will be appreciated that these spacers are sites where debris can be trapped and damage the fuel rods.

Each fuel bundle is surrounded by a channel. This channel causes water flowing between the upper and lower tie plate assemblies to be restricted to only one bundle in an isolated flow path between the tie plate assemblies. The channel also serves to separate the steam generating flow path through the fuel bundles from the surrounding core bypass region, this region being utilized for the penetration of the control rods. The water in the bypass region also provides neutron moderation.

In the operation of a boiling water nuclear reactor, maintenance of the originally designed flow distribution is very important. Specifically, from the lower (high pressure) plenum inlet to the core to the outlet from the core of the steam and water mixture through the upper tie plate assemblies of the fuel bundles, about 20 pounds per square inch (psi) of the pressure drop is encountered at typical flow operating conditions. About 7 to 8 psi of this pressure drop occurs through the fuel support casting. This pressure drop is mainly to assure the uniform distribution of coolant/moderator flow through the many fuel bundles making up the core of the reactor and is related to the prevention of operating instabilities within the reactor at certain power rates. At the lower tie plate assembly of each fuel bundle, from the inlet nozzle into the flow volume and through the tie plate grid, about 1 to 1½ psi pressure drop occurs which contributes to establishing flow distribution between the individual fuel rods of each fuel bundle. Finally, through the fuel bundle itself—from the exit of the lower tie plate assembly to the exit at the upper tie plate assembly—about 11 psi of pressure drop usually occurs. When new fuel bundles are introduced into a reactor core, these pressure drops must be preserved. Otherwise, the coolant/moderator flow distribution could be compromised.

With respect to the tie plate grid of the lower tie plate assembly, a matrix of cylindrical bosses and webs generally form the grid. The bosses are sized to receive the fuel rod end plugs. The spacing and thickness of the bosses and webs are primary factors in controlling pressure drop resulting from water flow through the grid.

In early grid constructions, since the fuel rods had greater cross-sectional diameters, the bosses were large. In more recent grid constructions, since the fuel rods have smaller cross-sectional diameters, the bosses are smaller. Also, in early constructions, fewer fuel rods formed a fuel bundle than in recent constructions.

Even with all of these changes in grid and bundle construction, however, it is necessary to avoid significantly altering pressure drop. For example, a core may be composed of older (8×8) bundles and newer (11×11) bundles, and the pressure drop through each bundle preferably is uniform. One challenge with new fuel bundle constructions, and particularly, lower tie plate grid constructions, is to accommodate more fuel rods and perform debris catching functions yet maintain a pressure drop equivalent to the pressure drop resulting from older bundle constructions.

Typically, debris within boiling water nuclear reactors can include extraneous materials left over from reactor construction, debris liberated from corrosion during the reactor lifetime, and during the numerous outages and repairs, further debris accumulates. Because nuclear reactors constitute closed circulation systems, it will be appreciated that debris will essentially accumulate with increasing age and use of the reactor. A particularly vexing and usual place for the accumulation of debris is in the fuel bundles between the fuel rods, particularly in the vicinity of the fuel rod spacers. It will be recalled that each fuel rod is surrounded by a spacer at the particular elevation of the spacer. Debris particles tend to lodge between the spacer structure and the fuel rods and often dynamically vibrate with the coolant/ moderator flow in abrading contact to the sealed cladding of the fuel rods.

SUMMARY OF THE INVENTION

The present invention provides a lower tie plate assembly including a debris catcher forming part of a grid. The grid has lower and upper portions, the lower portion serving to catch debris above a predetermined size, while simultaneously providing minimal pressure drop of water coolant through the grid. The grid also supports the fuel rods in a manner enabling a smooth, substantially uniform expansion of the flow into the fuel bundle. To accomplish the latter, a plurality of laterally spaced, generally cylindrical bosses, defining through openings, extend between upper and lower surfaces of the lower tie plate grid and receive lower ends of the fuel rods. Webs also extend between those surfaces and interconnect the bosses. The bosses and webs include respective portions thereof which extend upwardly from the lower portion of the grid and lie coextensively with the upper portion of the grid to define in the upper grid portion a plurality of flow spaces. The bosses are arranged on vertical centerlines arranged at the corners of square matrices, with the webs extending linearly between the bosses along the sides of the square matrices. Convex portions of the cylindrical bosses extend between the right angularly related webs of each matrix. Thus, the webs and the convex portions of the bosses of the upper portion of the lower tie plate grid define the flow spaces.

This lower grid portion has a plurality of openings extending therethrough and which open into the flow spaces. These lower grid portion openings separate debris above a certain size from the water flowing through those openings into the flow spaces between the boss and web portions in the upper grid portion. In a preferred embodiment of the present invention, a plurality of openings extend through the lower grid portion and open into each of the flow spaces. In order to minimize the pressure loss and maximize the debris catching function, the openings are specifically oriented, shaped and dimensioned. For example, given the shape of certain of the flow spaces defined by the web and boss portions, a first array of generally square openings with linear sides and radiussed corners are located in the lower grid portion such that vertical centerlines through these square openings intersect a diagonal of a square matrix and which diagonal passes through the vertical centerlines of the cylindrical bosses. A second array of openings having a plurality of sides in excess of four sides, preferably five generally linear sides, with adjacent sides having a radius therebetween, is oriented such that each opening of the second array has a side oriented generally parallel to a web.

Preferably, each opening in the lower grid portion has an optimal minimum area, e.g., a throat area, serving to catch debris larger than the minimum area and prevent it from passing through the grid. The openings in the lower portion transition from the minimum or throat areas into the flow spaces and preferably have walls laterally divergent in a direction toward the upper surface of the lower tie plate grid such that each opening defines a venturi in a direction toward the associated flow space. Consequently, the flow pattern for each opening obtains a substantially uniform velocity over its cross-section and which flow pattern flares as it transitions from the lower portion and enters the associated flow space in the upper grid portion to reduce the pressure loss and enable the flow to expand smoothly into the flow spaces. To further facilitate the debris catching function with minimum pressure drop, the lower grid portion has a thickness in the direction of flow less than about 25% of the overall thickness of the tie plate. Preferably, the ratio of the overall thickness of the tie plate grid to the thickness of the lower grid portion is within a range of 5–7 to 1. Additionally, the thickness of the lower grid portion is preferably less than about two times the shortest hole size dimension.

In a preferred embodiment according to the present invention, there is provided in a nuclear fuel assembly, a unitary one-piece lower tie plate grid comprising a lower grid portion and an upper grid portion, means for supporting fuel rods above the lower tie plate grid including the upper and lower grid portions, the supporting means comprising a plurality of laterally spaced bosses having portions extending upwardly from the lower grid portion, with the bosses being sized for receiving lower ends of the fuel rods. The supporting means further include web portions extending upwardly from the lower grid portion and interconnecting the boss portions to define with the boss portions a plurality of flow spaces in the upper grid portion extending from the lower grid portion and opening through an upper surface of the lower tie plate grid, the lower grid portion of the lower tie plate grid including a plurality of openings extending therethrough and opening into the flow spaces for separating debris from a coolant flowing through the lower grid portion into the flow spaces between the boss and the web portions.

In a further preferred embodiment according to the present invention, there is provided in a nuclear fuel assembly, a fuel rod support structure, comprising a lower tie plate assembly including an inlet nozzle, a unitary one-piece lower tie plate grid and a transition structure defining a flow volume for receiving coolant entering the nozzle and flowing coolant to the lower tie plate grid, the unitary one-piece lower tie plate grid having a lower grid portion and an upper grid portion. The lower tie plate grid comprises a plurality of laterally spaced bosses having portions extending upwardly from the lower grid portion, the bosses being sized for receiving lower ends of the fuel rods, the lower tie plate grid further including web portions extending upwardly from the lower grid portion and interconnecting the boss portions to define with the boss portions a plurality of flow spaces in the upper grid portion extending from the lower grid portion and opening through an upper surface of the lower tie plate grid, the lower grid portion of the lower tie plate grid including a plurality of openings extending therethrough and opening into the flow spaces for receiving the coolant from the flow volume and flowing the coolant through the lower grid portion into the flow spaces between the boss and the web portions.

In a further preferred embodiment according to the present invention, there is provided a nuclear fuel bundle and support therefor comprising upper and lower tie plate assemblies, a nuclear fuel bundle between the upper and lower tie plate assemblies and including a plurality of fuel rods, the lower tie plate assembly including means for supporting the nuclear fuel bundles, the lower tie plate assembly further including a lower tie plate grid having a lower grid portion and an upper grid portion. The lower tie plate grid comprises a plurality of laterally spaced bosses having portions extending upwardly from the lower grid portion, the bosses being sized for receiving lower ends of the fuel rods, the supporting means further including web portions extending upwardly from the lower grid portion and interconnecting the boss portions to define with the boss portions a plurality of flow spaces in the upper grid portion extending from the lower grid portion and opening through an upper surface of the lower tie plate grid. The lower grid portion of the lower tie plate grid includes a plurality of openings extending therethrough and opening into the flow spaces for flowing a coolant flowing through the lower grid portion into the flow spaces between the boss and the web portions.

Accordingly, it is a primary object of the present invention to provide a novel and improved unitary one-piece lower tie plate grid for supporting a nuclear fuel bundle and having a lower portion for limiting the passage of debris in the moderator flow through the tie plate grid with minimal pressure drop.

BRIEF DESCRIPTION OF THE DRAWINGS

FIG. 4 is an enlarged fragmentary top plan view of the lower tie plate grid illustrating four bosses for supporting fuel rods, the flow space therebetween, and openings through the lower grid portion which serve a debris catching function;

FIG. 5 is a cross-sectional view thereof taken generally about on line 5—5 in FIG. 4;

FIG. 6 is a cross-sectional view taken generally about on line 6—6 in FIG. 4;

BEST MODE FOR CARRYING OUT THE INVENTION

Figure 1:
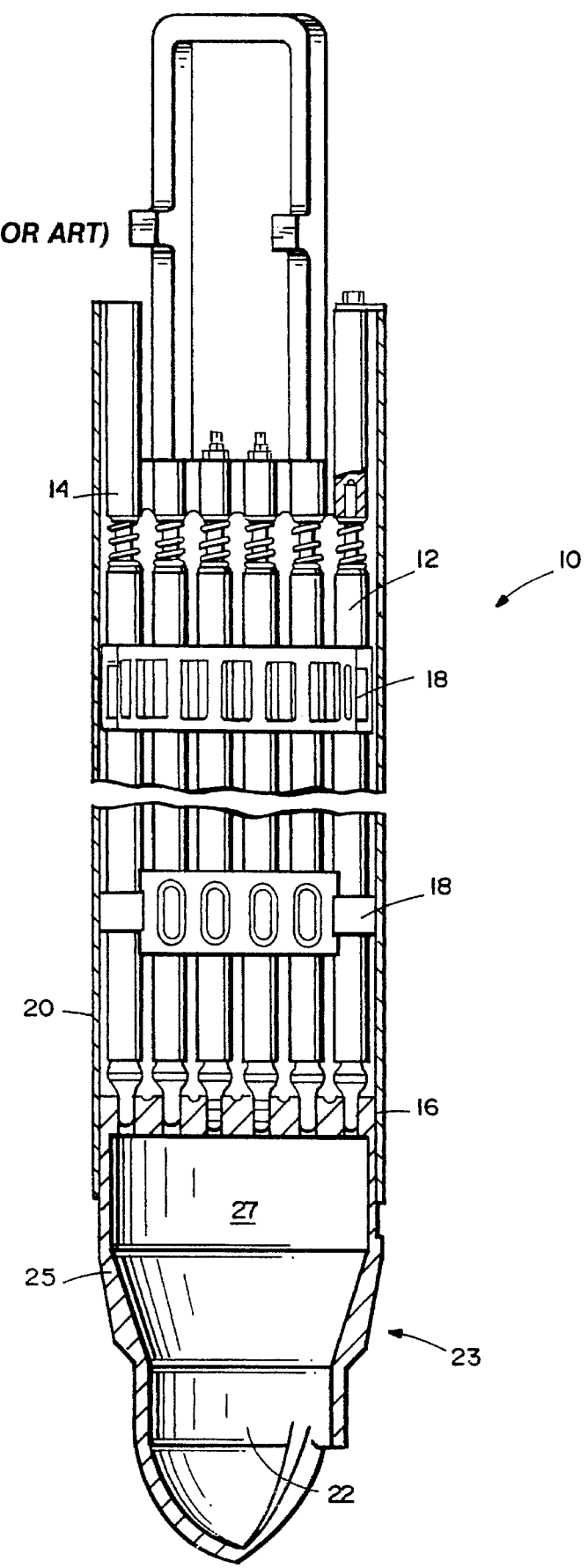
FIG. 1 is a vertical cross-sectional view of a conventional fuel assembly illustrating a fuel bundle supported on a lower tie plate assembly.

Referring now to the representative example of a fuel assembly, generally designated 10 in FIG. 1, there is illustrated a plurality of nuclear fuel rods 12 forming a nuclear fuel bundle. The rods 12 are connected at their upper ends to an upper tie plate 14 and are supported at their lower ends in a lower tie plate grid, generally designated 16, forming part of a tie plate assembly, generally designated 23. Spacers 18 are arranged at a plurality of vertically spaced locations to maintain lateral spacing of the fuel rods 12 relative to one another. The fuel bundle is disposed within a fuel bundle channel 20 whereby coolant water inlet through the bottom nozzle or inlet opening 22 of the tie plate assembly 23 flows upwardly therefrom through a transition structure 25 defining an enlarged flow volume 27 for flow through the lower tie plate grid 16 thereof and about the fuel rods whereby steam is generated. As indicated previously, it is important that debris in the flow of the coolant water be prevented from flowing into the area between the fuel rods. Accordingly, a lower tie plate assembly 23 including a unitary one-piece lower tie plate grid 16 serving the dual purpose of catching debris and supporting the fuel bundle according to the present invention is described and illustrated with respect to subsequent drawing figures.

Figure 2:
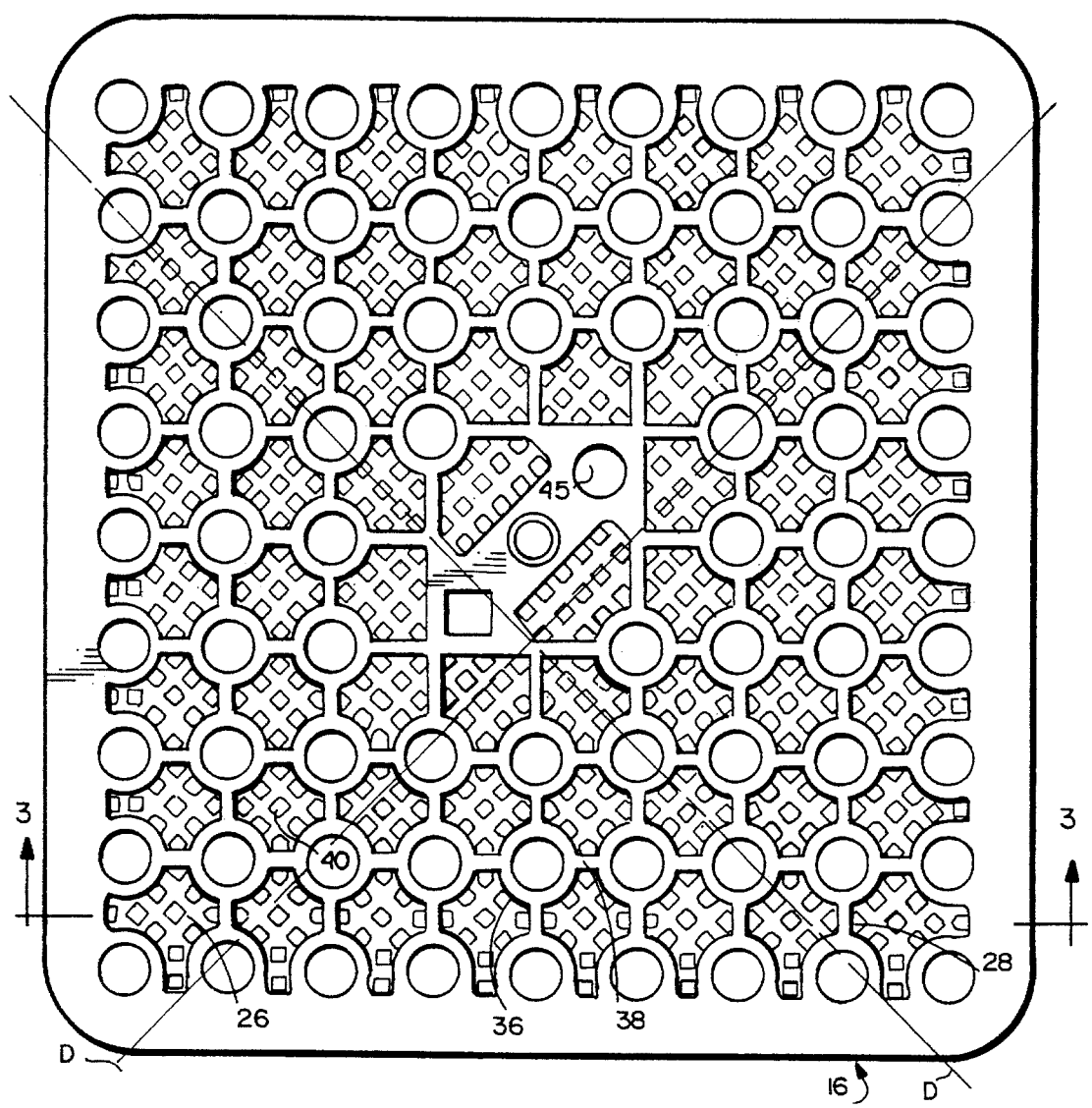
FIG. 2 is an enlarged top plan view of a lower tie plate grid constructed in accordance with the present invention.
Figure 3:
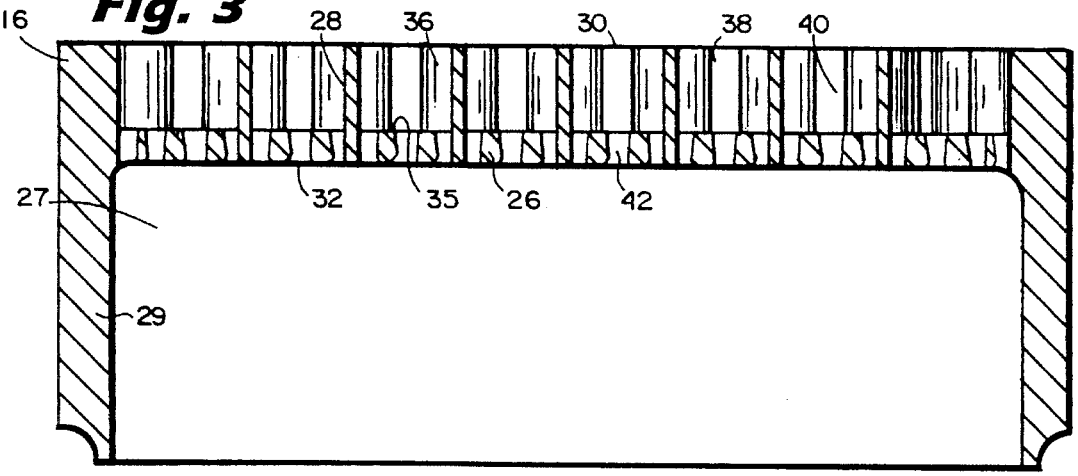
FIG. 3 is a cross-sectional view of the lower tie plate grid taken generally about on line 3—3 in FIG. 2.

Referring now to FIGS. 2 and 3, there is illustrated a unitary one-piece lower tie plate grid 16 according to the present invention forming a part of the lower tie plate assembly 23. Lower tie plate grid 16 may be integrally cast with the lower tie plate assembly 23 but is preferably formed separately and secured thereto as by welding its depending side walls 29 to assembly 23. Lower tie plate grid 16 has a lower grid portion 26 for separating debris from the flow of water through the tie plate with minimum pressure drop and an upper portion 28 which, together with the lower portion, support the fuel rods above the lower tie plate grid 16. The upper portion 28 affords flow spaces which assist to minimize the pressure drop across the lower tie plate grid and enable the fluid to expand within the flow spaces uniformly and smoothly for subsequent flow about the fuel rods. Turning first to FIG. 2, there is illustrated a plurality of generally cylindrical bosses 36 which extend between the upper and lower surfaces 30 and 32 (FIG. 3), respectively, of tie plate grid 16 for receiving the cylindrical end plugs of the nuclear fuel rods and supporting the latter, the bosses 36 having portions projecting upwardly from the upper surface 35 of the lower grid portion 36. As best seen in FIG. 2, the cylindrical bosses have centerlines arranged at corners of substantially square matrices of such bosses 36. Interconnecting and forming the sides of the square matrices are webs 38 adjoining the adjacent cylindrical bosses 36 along radial lines of bosses 36 and extending between the upper and lower surfaces 30, 32 of the lower tie plate grid 16. Consequently, it will be seen that above the lower grid portion 26, the webs 38 have portions formed along the sides of each square matrix and, together with convex outer portions of the cylindrical bosses 36, define side walls of upper flow spaces 40. As described below, the lower portion 26 has a plurality of openings for flowing coolant through the lower portion and into each of the flow spaces where the flow expands smoothly at reduced velocity for flow upwardly about the fuel rods supported by the lower tie plate assembly 23.

The debris catching function of the tie plate is performed by the lower grid portion 26. To accomplish this debris catching function, lower portion 26 includes a plurality of openings 42 which open through the lower surface 32 of grid 16 and through the upper surface 35 of the lower portion 26 into the flow spaces 40. From a review of FIGS. 2 and 3, it will be seen that the openings through the cylindrical bosses 36 extend between the upper and lower surfaces 30, 32, respectively, of grid 16. Openings 42, however, extend through only the lower portion 26 from lower surface 32 to surface 35 and open through surface 35 thereof into the flow spaces 40. The openings 42 are configured and dimensioned to maximize the debris catching function, while simultaneously minimizing the pressure drop across the lower grid portion resultant from the need to filter the debris from the coolant water.

As illustrated in FIG. 2, the central portion of the tie plate has openings 45 for water rods, not shown, which alter the arrangement of the openings 42 in the adjacent flow spaces defined by adjacent bosses 36 and webs 38. As stated hereafter, the openings 42 through lower portion 26 are of at least two types and both types comprise the openings through these central flow spaces as well as all other flow spaces.

More specifically, and referring to FIGS. 4–8, the openings 42 are arranged in a pattern relative to each of the flow spaces 40. To achieve maximum flow into each flow space 40 with minimum pressure drop, the openings 42 are arranged in a generally square pattern rotated 45° relative to the sides of the square matrices formed by the bosses. A review of FIG. 2 reveals that, while a different number of openings 42 open into the various configured flow spaces 40, i.e., the marginal flow spaces, the intermediate flow spaces shown particularly in FIG. 4 and the inner flow spaces adjacent the water rod openings 45 of FIG. 2, each such flow space 40 communicates with openings 42 arranged in this offset square pattern and openings of two different types, as will now be explained.

Figure 7:
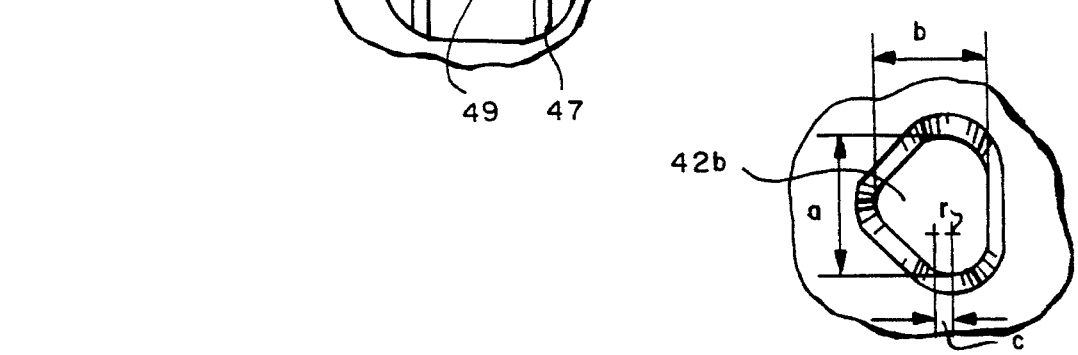
FIGS. 7 and 8 are fragmentary enlarged views of the two different types of openings in the lower grid portion constituting openings of the different arrays thereof.
Figure 8:
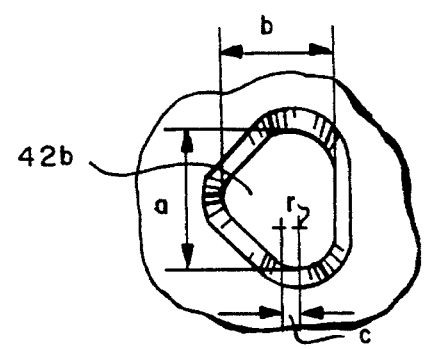

In a preferred form, each opening 42a (FIG. 4) of a first array of openings opening into each flow space 40 has a generally square configuration with linear sides and radiussed corners between adjacent sides (see FIG. 8). Each opening 42b (FIG. 4) of a second array of openings has a plurality of sides in excess of four sides, preferably five sides, with adjacent sides of each opening of the second array having a radius therebetween (see FIG. 7). In order to maximize the debris catching function and minimize the pressure loss, the first and second arrays of openings 42 are particularly arranged relative to one another and to the corresponding or associated flow spaces 40. Thus, each opening 42a of the first array of openings 42 is located such that a vertical centerline through the opening intersects a diagonal of the square matrices and which diagonal passes through the convex portions and the vertical centerlines of the cylindrical bosses 36. Thus, the dashed lines D in FIG. 4 represent diagonals between the centerlines of diagonally related bosses 36 and which diagonals are intersected by the centerlines of the openings 42a of the first array of openings 42. Note also that the openings 42b of the second array have a linear side generally parallel to the webs 38 interconnecting the bosses and that two of their remaining sides are generally parallel to the sides of the openings 42a of the first array. Referring to FIGS. 5 and 6, the edges 45 of the openings 42 opening through the lower surface 32 of the tie plate are radiussed to provide a smooth, non-turbulent transitional flow from the inlet plenum of the tie plate assembly into the opening 42.

Referring to the cross-sectional views of FIGS. 5 and 6, the openings are tapered at 47 from a minimum throat area 49 at the end of the inlet radius 45 to a maximum dimension at the top surface 35 of lower portion 26. This gradual enlargement of the openings 42 provides a diffuser or venturi action so that the flow can expand from the minimum flow area with minimal pressure loss.

There is a change in flow area from the exits of the openings 42 into the volume, i.e., flow spaces 40 above the openings which causes a pressure loss. While this pressure loss can be reduced by increasing the aperture exit area, increasing the flare angle of the apertures, or increasing the thickness of the lower portion while maintaining the flare angle constant, practical problems in the manufacturing process as well as possible flow separation may occur. Thus, the described and illustrated arrangement and shape of the openings 42 are optimal.

As will be appreciated, the coolant flows through the openings 42 and into the flow spaces 40. In view of the larger volume of the flow spaces 40, the flow pattern through openings 42 flares and transitions smoothly into the associated flow space 40 with minimal pressure drop.

In a particular preferred form of the present invention, there is provided a generally square lower tie plate 5.41 inches on a side, having a total cross-sectional area of 29.27 square inches. The flow area through the openings 42 of the lower grid portion is 4.3 square inches and hence the ratio of the flow area through the openings 42 to the area of the lower grid portion 26 of the tie plate is about 0.15. Additionally, the thickness of the lower portion 26 is preferably less than about 25% of the overall thickness of the tie plate. In a preferred embodiment, the thickness of tie plate grid 16 between upper and lower surfaces 30 and 32 is about 0.590 inches and the thickness of the lower grid portion 26 is 0.150 inch. Accordingly, in a preferred embodiment hereof, the ratio of the overall thickness of the tie plate grid to the thickness of the lower grid portion thereof is within a range of 3–4 to 1 and preferably about 3.9 and should also be preferably less than about two times the size of the opening 42 along a line perpendicular to its edges. Additionally, the radii 45 of the openings 42 adjacent the lower surface of the tie plate is about 0.029 inch and the width of the metal between adjacent openings 45a is about 0.058 inch as indicated at x in FIG. 6.

Referring again to FIGS. 4–8, and in a preferred form of the present invention, the generally square openings constituting the first array of openings, are preferably 0.088 inches on a side at the throat 49, with a radius r of 0.030 inches between adjacent sides. Each opening of the second array of openings, as illustrated in FIG. 7, has a dimension a at throat 49 equal to 0.100 inches, a dimension b equal to 0.090 inches and a dimension c equal to 0.010 inch, with radii r between adjacent linear sides of 0.030 inch. The distance between adjacent linear sides of the openings at throats 49 is 0.058 inch. The centerline-to-centerline distance between the bosses along the sides of the square matrices is preferably 0.566 inches, with the thickness of the webs and convex portions of the bosses being 0.070 inches.

Figure 9:
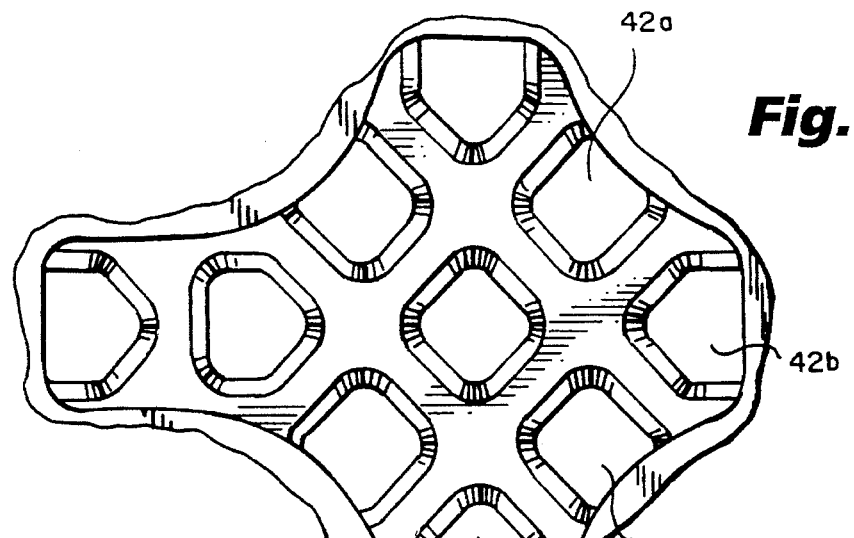
FIGS. 9 and 10 are fragmentary enlarged top plan views of a preferred embodiment of openings through the lower grid portion in side and corner regions, respectively, of the lower tie plate grid.
Figure 10:
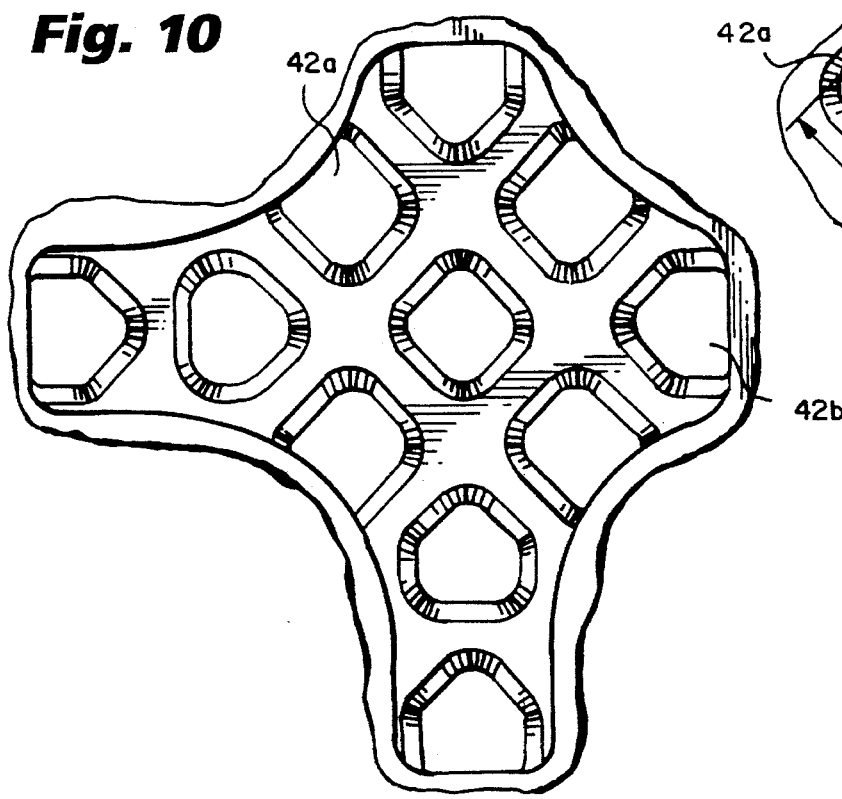

FIGS. 9 and 10 show the arrangements of the openings in the edge and corner regions, respectively, of the tie plate grid. The aperture shapes are basically the same as in the central region of the grid, with slight modifications where the holes are adjacent to bosses or webs.

Figure 11:
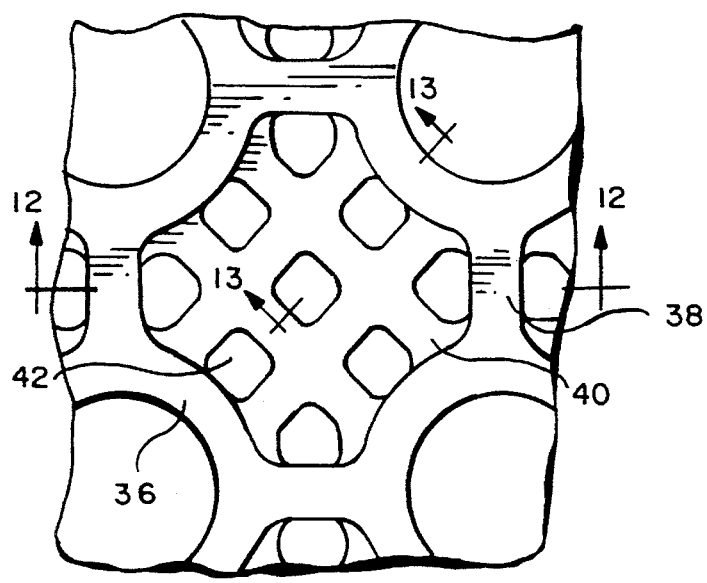
FIGS. 11, 12 and 13 are views similar to FIGS. 4, 5 and 6, respectively, illustrating a further embodiment hereof with FIGS. 12 and 13 being cross-sectional views taken about on lines 12—12 and 13—13 in FIG. 11, respectively.
Figure 13:
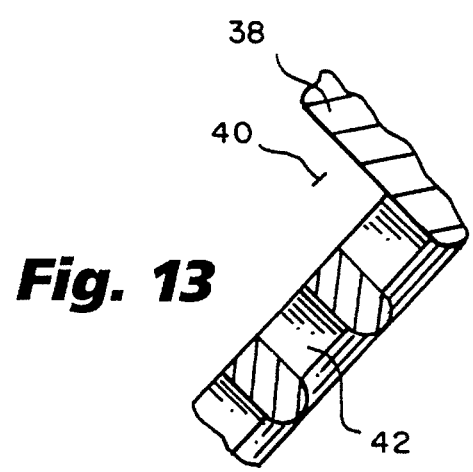
Figure 12:
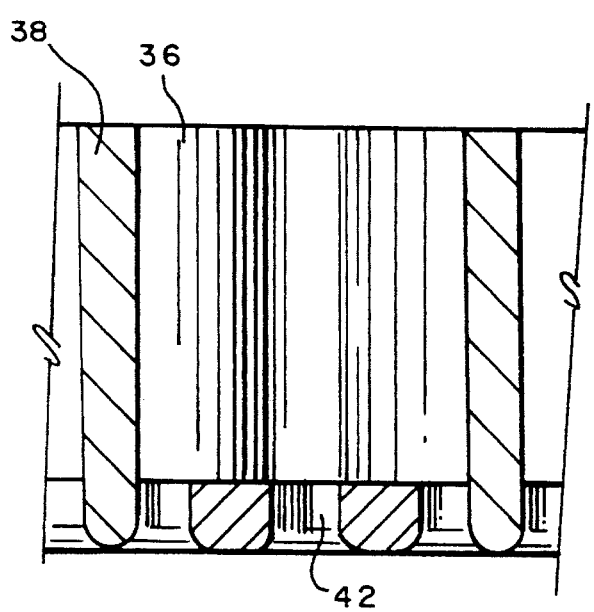

FIGS. 11, 12 and 13 show an alternate embodiment of the invention wherein like numerals indicate like parts as in the prior embodiment. In this embodiment, the walls of the openings 42 do not flare outwardly and are generally parallel to one another. Also, the lower grid portion is thinner than in the prior embodiment. This embodiment facilitates casting the grid because the ratio of lower grid thickness to the dimension of the opening 42a is smaller. For example, the thickness of the lower grid portion is 0.100 inch and therefore a preferred ratio of overall thickness of the tie plate grid to the lower grid portion is within a range of 5–7 to 1 and preferably about 5.9. However, the pressure loss through the grid, in this embodiment, is greater because of the diffuser action through the holes is not present.

Figure 14:
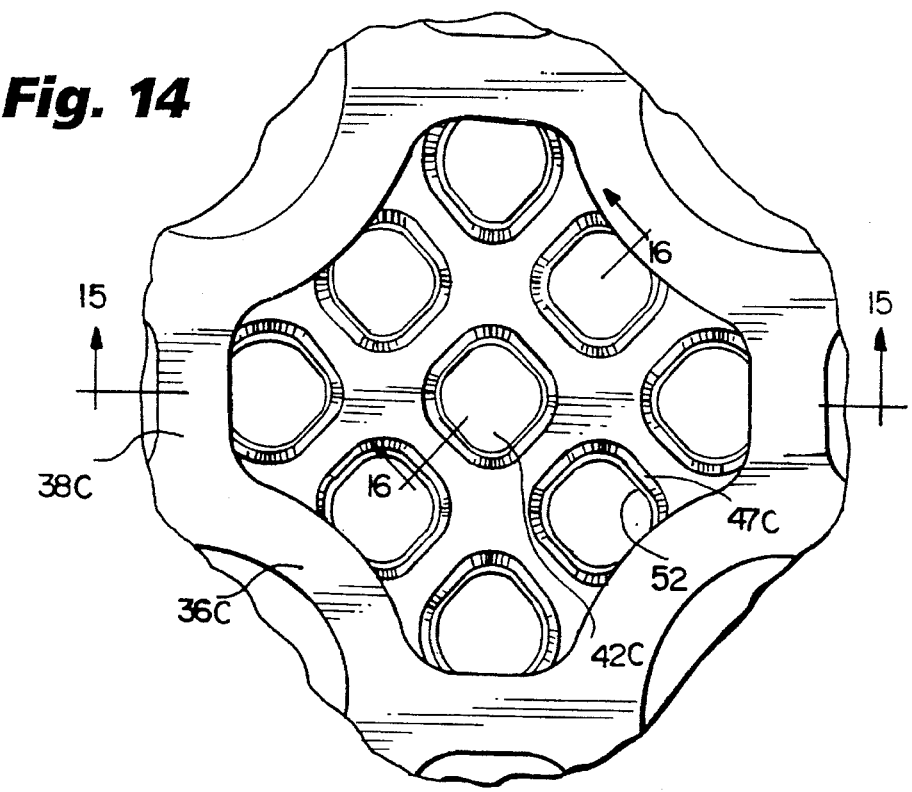
FIGS. 14, 15 and 16 are views similar to FIGS. 4, 5 and 6, respectively, illustrating a still further embodiment hereof with FIGS. 15 and 16 being cross-sectional views taken about on lines 15—15 and 16—16 in FIG. 14, respectively.
Figure 15:
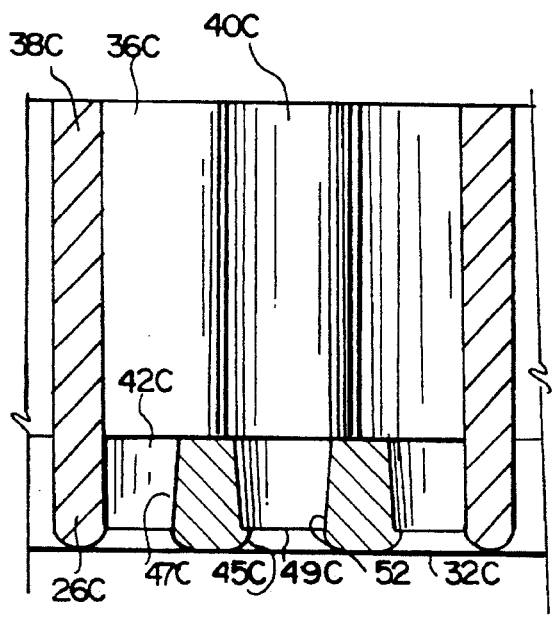
Figure 16:
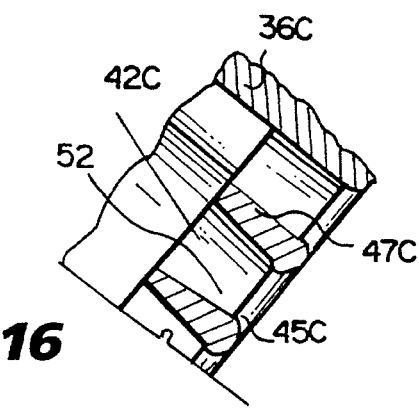

FIGS. 14, 15 and 16 illustrate a still further embodiment of the invention similar to the first embodiment hereof and wherein like numerals are used to denote like parts followed by the suffix "c." Thus, the lower grid portion 26c has a thickness identical to the thickness of the preferred embodiment illustrated in FIGS. 3–8, and the openings have an outward flare 47c from a minimum or throat area 49c to the top exits of the openings. However, there is step change in the opening size at the end of the entrance radius and which step is indicated at 52.

More particularly, the openings 42c in the lower portion 26c into the flow spaces 40c defined by the bosses 36c and webs 38c are defined in part by a radius 45c at the juncture of the opening and the lower surface 32c of the tie plate. Above the radius, however, the side walls of the openings 42c taper at 47c divergently away from one another in a vertically upward direction. Additionally, the step 52 lies at the transition between the radiussed lower edge 45c at the minimum inlet dimension and the tapered walls 47c of the opening. Step 52 faces in an upward vertical direction. It will be appreciated that with this overall configuration, each such opening forms a diffuser with the flow first converging along radii 45c and then gradually diverging along tapered walls 47c as the flow enters the flow space 40c above the lower grid portion. This enables the flow to expand smoothly in the upward direction, reducing the pressure loss. The step 52 is of a minimum dimension consistent with manufacturing requirements and tolerances to minimize any increase in pressure loss by virtue of the step. The step ensures as smooth a transition between the radiussed inlet 45c of the opening 42c and the divergent walls 47c consistent with the casting process used to manufacture the one-piece integral unitary tie plate.

This step 52 can be used to alleviate some of the problems in casting the grid 26. For example, the tie plate grids are investment castings produced using the lost wax process. First a "wax" model of the final part is made. This wax model is coated with several layers of ceramic which later form a mold for the final metal part. Then the wax is evaporated and metal is poured into the remaining ceramic mold.

The mold for the "wax" is in two parts which mate when the inlet radius 45c ends. If the two halves of the mold do not match exactly, the upper part of each hole will be offset relative to the lower and wax will project into the holes at the interface between the upper and lower molds. The final metal part will have exactly the same shape as the wax. Any material projecting into the openings must be removed, and any sharp edges due to offset must be rounded.

The step in the openings minimize these problems while causing increased pressure loss due to the sudden expansion at the step. The pressure loss is intermediate between that of the preferred embodiment with smooth tapers and the embodiment with no taper.

Figure 17B:
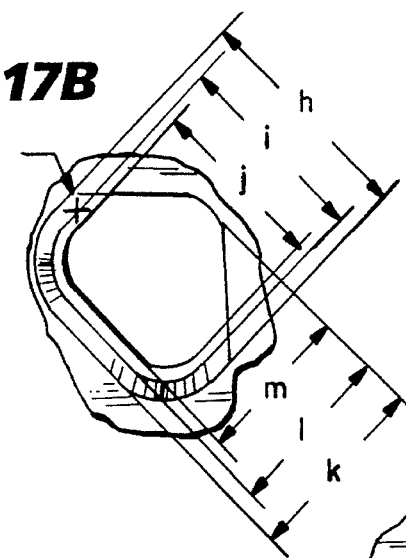
FIGS. 17a–17e are enlarged plan views of the opening through the lower grid portion of the embodiment hereof illustrated in FIGS. 14–16.
Figure 17C:
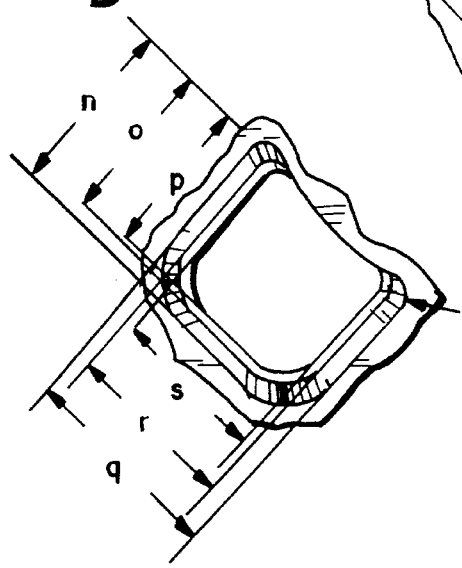
Figure 17A:
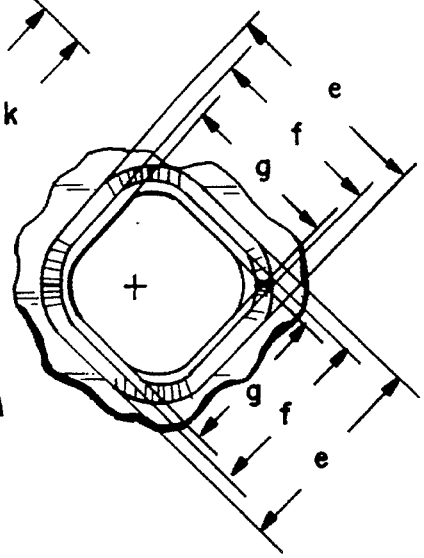
Figure 17D:
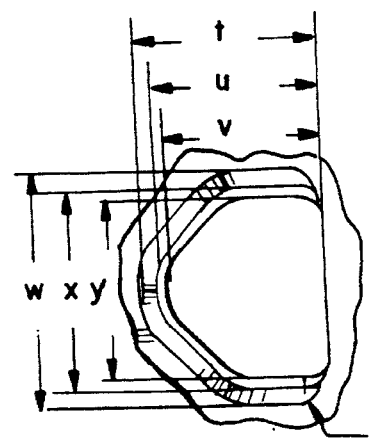
Figure 17E:
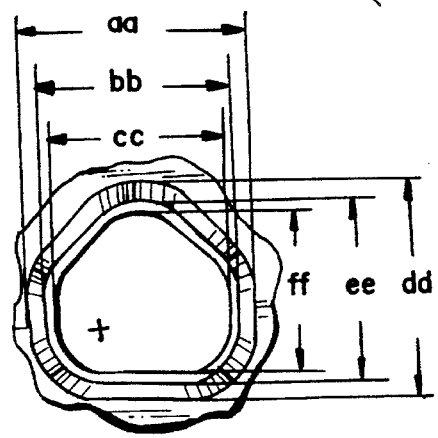

Referring now to FIGS. 17a–17e, it will be seen that there are five different configurations or arrays of openings 42, although the openings shown in FIGS. 17a and 17c are considered generally square openings with radiussed corners between adjacent sides, notwithstanding that the opening illustrated in FIG. 17c has one side slightly curved to accommodate the convex portion of the web. Thus, the openings of FIGS. 17a and 17c are arranged similarly as in the previous embodiment along diagonals parallel to or interconnecting the centerlines of diagonally related bosses of the square matrices. The remaining openings illustrated in FIGS. 17b, 17d and 17e each have five linear extending sides with corner radiusses therebetween. In a preferred embodiment of the present invention, the dimensions of the openings are as follows: FIG. 17a: $e$=0.118; $f$=0.098; $g$=0.088; FIG. 17b: $h$=0.130; $i$=0.110; $j$=0.100; $k$=0.105; $l$=0.095; $m$=0.090; FIG. 17c: $n$=0.103; $o$=0.093; $p$=0.088; $q$=0.118; $r$=0.098; $s$=0.088; FIG. 17d: $t$=0.105; $u$=0.095; $v$=0.090; $w$=0.130; $x$=0.110; $y$=0.100; and FIG. 17e: $aa$=0.130; $bb$=0.110; $cc$=0.110; $dd$=0.121; $ee$=0.101; $ff$=0.091.

Radii R1, R2 and R3 in FIG. 14a are 0.030, 0.035 and 0.045 inches, respectively.

The total cross-sectional area and flow area through the openings of the tie plate of this embodiment are similar to that of the previously described embodiment. The thickness of the lower grid portion is 0.150 inch, the overall thickness of the tie plate grid is 0.590 inch and the ratio of the overall thickness of the tie plate to the thickness of the grid portion thereof in this second embodiment is about 3.93 and preferably within a range 3–4 to 1. Additionally, the radii of the openings adjacent the lower surface of the tie plate is about 0.029 inch.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. In a nuclear fuel assembly, a unitary one-piece lower tie plate grid comprising:

a lower grid portion and an upper grid portion;

means for supporting fuel rods above the lower tie plate grid including said upper and lower grid portions;

said supporting means comprising a plurality of laterally spaced cylindrical bosses having apertures extending therethrough and cylindrical boss portions extending upwardly from said lower grid portion, said bosses being sized for receiving lower ends of the fuel rods in said apertures, said supporting means further including web portions extending upwardly from said lower grid portion and interconnecting said boss portions to define with said boss portions a plurality of flow spaces in said upper grid portion extending from said lower grid portion and opening through an upper surface of said lower tie plate grid;

said boss portions having vertical centerlines arranged at the corners of square matrices with said web portions extending linearly between said boss portions along sides of the square matrices and convex portions of said cylindrical boss portions extending between perpendicularly oriented web portions of each matrix, said web portions and said convex portions defining side walls of the flow spaces;

said lower grid portion of said lower tie plate grid including a plurality of openings extending therethrough and opening into said flow spaces for separating debris from a coolant flowing through said lower grid portion into said flow spaces between said boss and said web portions.

2. A unitary one-piece lower tie plate grid according to claim 1 wherein said openings have a generally square configuration with linear sides thereof extending about 45° relative to the sides of the square matrices.

3. A unitary one-piece lower tie plate grid according to claim 1 wherein the ratio of the overall thickness of the tie plate grid to the thickness of the lower grid portion thereof is within a range of 5–7 to 1, the ratio of the flow area through said openings to the area of the lower grid portion being about 0.15.

4. A unitary one-piece lower tie plate grid according to claim 1 wherein a first array of said plurality of openings opening into each flow space have a generally square configuration with linear sides, a second array of said plurality of openings opening into each flow space having a plurality of sides in excess of four sides, adjacent sides of each opening of each array thereof having a radius therebetween.

5. A unitary one-piece lower tie plate grid according to claim 4 wherein each opening of said first array thereof being located such that a centerline thereof intersects a diagonal of a square matrix and which diagonal passes through said convex portions, each opening of said second array of said plurality of openings having a side oriented generally parallel to a web portion.

6. A unitary one-piece lower tie plate grid according to claim 1 wherein said openings along a lower surface of said tie plate grid are radiussed, side wall portions of said openings opening into said flow spaces being laterally divergent in a direction toward said upper tie plate surface, and a throat between said radiussed openings and said divergent side wall portions having a minimum cross-sectional area whereby each said opening defines a venturi in a direction toward said flow spaces.

7. A unitary one-piece lower tie plate grid according to claim 6 wherein each said opening is defined by a step adjacent said throat between said radiussed opening and said divergent side wall portions whereby the size of each opening is increased immediately downstream of said step.

8. A unitary one-piece lower tie plate grid according to claim 6 wherein a plurality of said openings extending through said lower grid portion and opening into each flow space between the side walls thereof, said plurality of openings being aligned with one another along a diagonal direction relative to said square matrices.

9. A unitary one-piece lower tie plate grid according to claim 6 wherein the ratio of the overall thickness of the tie plate grid to the thickness of the lower grid portion is within a range of 3–4 to 1, the thickness of the lower grid portion being less than twice the size of the openings.

10. A unitary one-piece lower tie plate grid according to claim 6 wherein a first array of said plurality of openings opening into each flow space have a generally square configuration with linear sides, a second array of said plurality of openings opening into each flow space having a plurality of sides in excess of four sides, adjacent sides of each opening of each array thereof having a radius therebetween, each opening of said first array thereof being located such that a centerline thereof intersects a diagonal of a square matrix and which diagonal passes through said convex portions, each opening of said second array of said plurality of openings having a side oriented generally parallel to a web portion.

11. In a nuclear fuel assembly, a fuel rod support structure, comprising:

a lower tie plate assembly including an inlet nozzle, a unitary one-piece lower tie plate grid and a transition structure defining a flow volume for receiving coolant entering said nozzle and flowing coolant to said lower tie plate grid;

said unitary one-piece lower tie plate grid having a lower grid portion and an upper grid portion;

said lower tie plate grid comprising a plurality of laterally spaced cylindrical bosses having apertures extending therethrough and cylindrical boss portions extending upwardly from said lower grid portion, said bosses being sized for receiving lower ends of the fuel rods in said apertures, said lower tie plate grid further including web portions extending upwardly from said lower grid portion and interconnecting said boss portions to define with said boss portions a plurality of flow spaces in said upper grid portion extending from said lower grid portion and opening through an upper surface of said lower tie plate grid;

said boss portions having vertical centerlines arranged at the corners of square matrices with said web portions extending linearly between said boss portions along sides of the square matrices and convex portions of said cylindrical boss portions extending between perpendicularly oriented web portions of each matrix, said web portions and said convex portions defining side walls of the flow spaces;

said lower grid portion of said lower tie plate grid including a plurality of openings extending therethrough and opening into said flow spaces for receiving the coolant from said flow volume and flowing the coolant through said lower grid portion into said flow spaces between said boss and said web portions;

said plurality of openings being aligned with one another along a diagonal direction relative to said square matrices.

12. A fuel rod support structure according to claim 11 wherein said openings along a lower surface of said tie plate grid are radiussed, side wall portions of said openings opening into said flow-spaces being laterally divergent in a direction toward said upper tie plate surface, and a throat between said radiussed openings and said divergent side wall portions having a minimum cross-sectional area whereby each said opening defines a venturi in a direction toward said flow spaces.

13. A fuel rod support structure according to claim 11 wherein a first array of said plurality of openings opening into each flow space having a generally square configuration with linear sides, a second array of said plurality of openings opening into each flow space having a plurality of sides in excess of four sides, adjacent sides of each opening of each array thereof having a radius therebetween, each opening of said first array thereof being located such that a centerline thereof intersects a diagonal of a square matrix and which diagonal passes through said convex portions, each opening of said second array of said plurality of openings having a side oriented generally parallel to a web portion.

14. A nuclear fuel bundle and support therefor comprising:

upper and lower tie plate assemblies;

a nuclear fuel bundle between said upper and lower tie plate assemblies and including a plurality of fuel rods;

said lower tie plate assembly including means for supporting said nuclear fuel bundles, said lower tie plate assembly further including a lower tie plate grid having a lower grid portion and an upper grid portion;

said lower tie plate grid comprising a plurality of laterally spaced cylindrical bosses having apertures extending therethrough and cylindrical boss portions extending upwardly from said lower grid portion, said bosses being sized for receiving lower ends of said fuel rods in said apertures, said supporting means further including web portions extending upwardly from said lower grid portion and interconnecting said boss portions to define with said boss portions a plurality of flow spaces in said upper grid portion extending from said lower grid portion and opening through an upper surface of said lower tie plate grid;

said boss portions having vertical centerlines arranged at the corners of square matrices with said web portions extending linearly between said boss portions along sides of the square matrices and convex portions of said cylindrical boss portions extending between perpendicularly oriented web portions of each matrix, said web portions and said convex portions defining side walls of the flow spaces;

said lower grid portion of said lower tie plate grid including a plurality of openings extending therethrough and opening into said flow spaces for flowing a coolant flowing through said lower grid portion into said flow spaces between said boss and said web portions;

said plurality of openings being aligned with one another along a diagonal section relative to said square matrices.

15. A nuclear fuel bundle and support therefor according to claim 14 wherein said openings along a lower surface of said tie plate are radiussed, side wall portions of said openings opening into said flow spaces being laterally divergent in a direction toward said upper tie plate surface, and a throat between said radiussed openings and said divergent side wall portions having a minimum cross-sectional area whereby each said opening defines a venturi in a direction toward said flow spaces.

16. A nuclear fuel bundle and support therefor according to claim 14 wherein a first array of said plurality of openings opening into each flow space have a generally square configuration with linear sides, a second array of said plurality of openings opening into each flow space having a plurality of sides in excess of four sides, adjacent sides of each opening of each array thereof having a radius therebetween, each opening of said first array thereof being located such that a centerline thereof intersects a diagonal of a square matrix and which diagonal passes through said convex portions, each opening of said second array of said plurality of openings having a side oriented generally parallel to a web portion.

* * * * *